(12) United States Patent
Mäkelä

(10) Patent No.: US 8,472,329 B2
(45) Date of Patent: Jun. 25, 2013

(54) PRESENTING CONFIRMATION QUERIES FOR NETWORK USAGE

(75) Inventor: Mikko Mäkelä, Tampere (FI)

(73) Assignee: Nokia Corporation, Espoo (FI)

( * ) Notice: Subject to any disclaimer, the term of this patent is extended or adjusted under 35 U.S.C. 154(b) by 951 days.

(21) Appl. No.: 10/838,137

(22) Filed: May 3, 2004

(65) Prior Publication Data

US 2005/0243727 A1 Nov. 3, 2005

(51) Int. Cl.
*H04J 3/14* (2006.01)

(52) U.S. Cl.
USPC .............................. 370/252; 455/567; 705/52

(58) Field of Classification Search
USPC .................. 370/241, 252, 263, 301, 326, 329, 370/332, 395.4, 498, 259, 395.3; 455/418; 705/20, 40, 51, 52, 61; 709/225, 226, 222; 717/170, 172, 173
See application file for complete search history.

(56) References Cited

U.S. PATENT DOCUMENTS

| | | | |
|---|---|---|---|
| 5,943,320 A * | 8/1999 | Weik et al. | 370/259 |
| 6,285,660 B1 * | 9/2001 | Ronen | 370/259 |
| 2001/0032182 A1 * | 10/2001 | Kumar et al. | 705/40 |
| 2002/0094847 A1 * | 7/2002 | Han | 455/567 |
| 2003/0100303 A1 * | 5/2003 | Armbruster et al. | 455/433 |
| 2003/0126243 A1 * | 7/2003 | Kudo et al. | 709/222 |
| 2004/0128527 A1 * | 7/2004 | Witt, Jr. | 713/200 |
| 2005/0058067 A1 * | 3/2005 | Chmaytelli et al. | 370/230 |

* cited by examiner

*Primary Examiner* — Andrew Lai
*Assistant Examiner* — Leon Andrews
(74) *Attorney, Agent, or Firm* — Harrington & Smith

(57) ABSTRACT

The invention relates to network connection management, wherein user confirmations are queried for implementing operations requiring a network connection. According to the invention the user confirmation are queried variantly depending on the initiator of the operation. The invention relates to a devices for browsing the network and to a computer program product.

15 Claims, 2 Drawing Sheets

PRESENTING CONFIRMATION QUERIES FOR NETWORK USAGE

FIELD OF THE INVENTION

This invention relates generally to a network connection management and particularly to confirmation queries relating to the connection session.

BACKGROUND OF THE INVENTION

Portable devices such as mobile phones are shifting from voice communication to data communication. The amount of different connecting networks is increasing due to different data types. For example GSM data, HSCSD (high speed circuit switched data) and GPRS are accompanied with Bluetooth and WLAN.

Portable devices are capable of viewing web pages as well as other views designed for bigger (e.g. personal computer) displays. By means of mobile browsers of some portable devices (such as applicants Series 60.™.-type of terminals), a user can view almost any kind of web page by using built-in browser software.

A cost of a download can be different between connecting networks used for browsing e.g. the internet. With public land mobile network (PLMN) technologies, such as GPRS, the user has to pay considerable costs according to amount of downloaded data. With LAN technologies like WLAN the amount of downloaded data typically does not have an effect on costs the user has to pay.

For establishing a connection the mobile browsers usually require user confirmation before the connection is created. According to this, the user is made aware of the size and price of the downloaded data, and unpleasant situations of billing the user enormously may be avoided. User confirmation is usually required every time the user creates the network connection in the browser as well as at times of downloading.

Continuous confirmations naturally increase user interaction. However if the confirmations are not asked, the user may be billed without his/her knowledge. This would be possible because some downloads may not be directly executed by the user (automatic reload by "refresh" function, script originated downloads that may be triggered after some timeout etc.).

SUMMARY OF THE INVENTION

It can be seen, that an improved connection management is needed. It is thus an aim of the current invention to provide such a connection management, which reduces the user confirmations but at the same time can prevent the unwanted downloads.

Another aim of the current invention is to provide a method, which can be used for deciding which connection requests need user confirmation and requiring user confirmation only for those.

Thus, in the method according to the invention for managing a network connection a need for user confirmation is determined by comparing the loading situation to predetermined conditions and the user confirmation is queried according to the need. The device according to the invention comprises means for implementing an operation for which the network connection is needed, said device being configured to determine whether the operation is initiated from direct user interaction and if so, to leave a user confirmation unasked. The computer program product according to the invention comprises a computer program comprising computer readable instructions for implementing an operation for which the network connection is needed, said determining whether the operation is initiated from direct user interaction and if so, to leave a user confirmation unasked.

Downloading operations in modern internet browsing can be originated directly from the user. Downloading can also be executed by the device, e.g. due to timers in a script code etc. By determining the initiator for the download, the need for confirmation can be solved.

The invention has advantages compared to the related art. Due to the invention less user interaction is needed because confirming queries are needed only for certain downloads. User experience may become seamless and the operating may become more usable. Additionally, the reduced user interaction may reduce the memory consumption.

The browser settings can be simplified because at least a setting for "Require confirmation before starting a connection" with values "Yes/No" can be removed Further, as stated, although the user confirmations are reduced it is taken care of that unwanted connection/download may not be done.

DESCRIPTION OF THE DRAWINGS

A better understanding of the invention may be obtained from the following considerations taken in conjunction with the accompanying drawings, which are not meant to restrict the scope of the invention in any way.

DETAILED DESCRIPTION OF THE INVENTION

Figure 1:
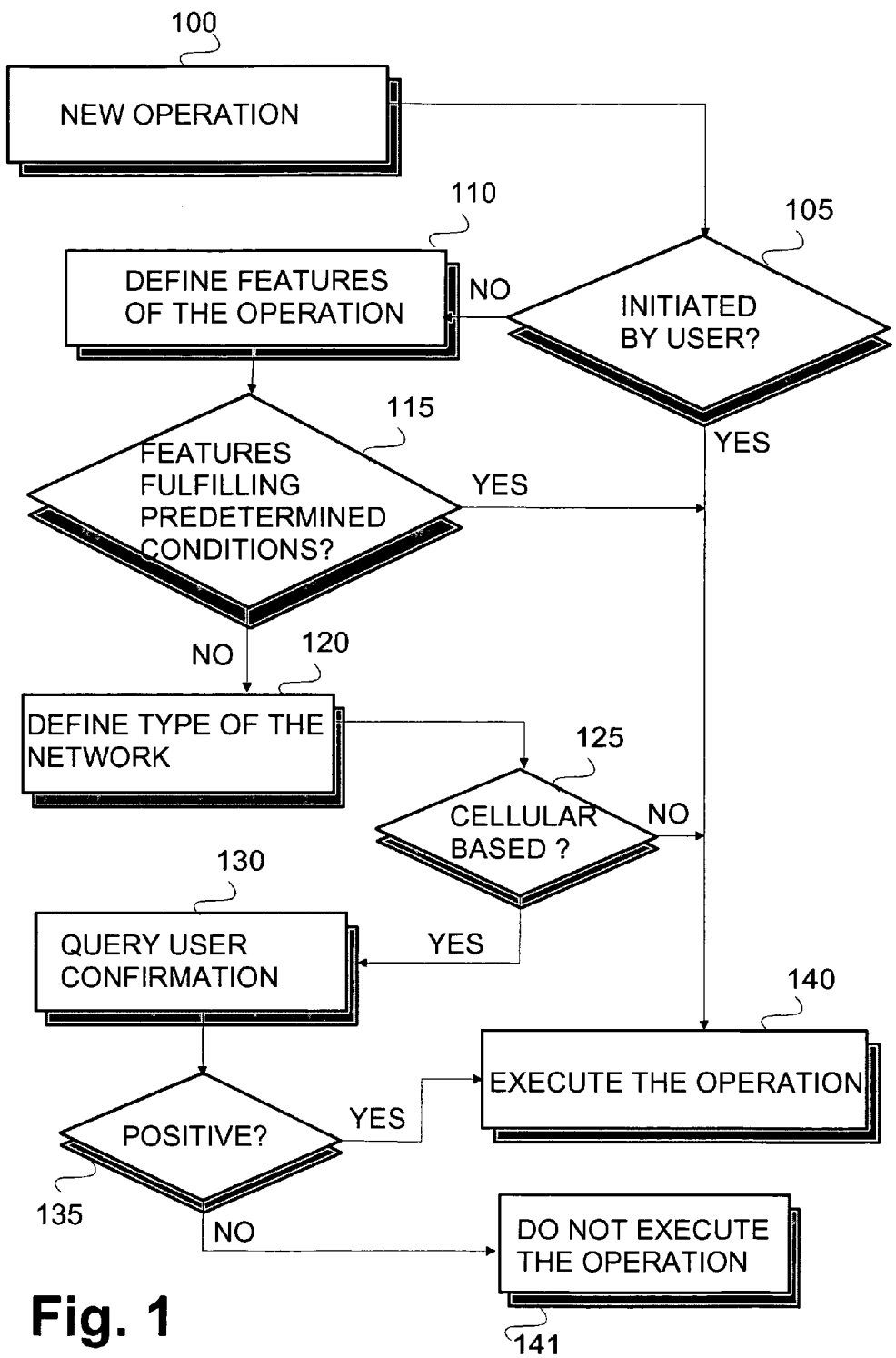
FIG. 1 illustrates as an example a flow chart of an embodiment according to the invention.

Network connection of a computing device, especially of a mobile device, is typically created after user confirmation has been requested. This confirmation is required every time the connection is created. Similarly user confirmation may be requested every time a loading is performed. Thanks to the invention it is noticed that most of the confirmations are needless because most connection requests are executed from functions from which the user can easily understand that a connection will be created. These functions are the ones user has him/herself initiated, such as selecting a bookmark or a link and establishing the connection process.

In the description term "direct user interaction" corresponds to an operation being executed by the user. Direct user interaction can be e.g. selecting a bookmark, selecting a link on a page, script code executed immediately after triggering an event attribute like "onClick"/"onchange" etc. Other operations, which are not executed directly by the user are for example an automatic reload according to <meta> elements refresh value, a reload/redirection executed via JavaScript's setTimeOut method or a "onClose" event attribute etc. are referred by "device interaction". Although specific terms are used in the following description for the sake of clarity, these terms are intended to refer to this example of the invention selected for illustration in the drawings and are not intended to define or limit the scope of the invention.

Basic Principles

The logic according to the invention is used for determining which connection requests for an operation really need user confirmation and requiring user confirmation only for those. The network connection needs to be loaded for implementing the operation and is established due to a user approval. The approval can be received from the user by querying a user confirmation. However if the operation is initiated from direct user interaction, the user confirmation is left unasked for the user approval is assumed. The loading can relate to establishing the network connection downloading in an existing network connection, or to downloading in a not yet existing network connection.

At first it is solved whether the connection is due to direct user interaction or due to device interaction. If an operation that requires a connection is due to direct user interaction the user confirmation is not required. It can be assumed that the user—when selecting a link in a browser etc—easily understands that a connection is needed for that operation.

However, if the operation that requires connection is due to the device interaction, e.g. by a script after a timeout, the user confirmation is required if the connection is made using technology in which creating connection/downloading data causes additional costs to the user. However if the connection is made using a technology by means of which creating connecting/downloading data does not cause additional costs to the user the user confirmation may not be required.

These principles are utilized depending whether the connection is already open (existing) or not or whether the total amount of the downloaded data is more than a predetermined limit.

Existing Network Connection:

In the situation, where a suitable connection is already established, it is checked whether the operation that requires a network connection was executed by the user or the device. If there was a direct user interaction, no queries for confirmation are presented before starting to download. However if the operation was not due to direct user interaction, the size of the downloadable data is checked. For example if less than 1 MB was downloaded and e.g. less than 2 downloads were initiated after the last download executed by direct user interaction, no confirmations are queried before starting to download. On the other hand, in that situation more than 1 MB was downloaded and/or more than 1 download were initiated after the last download executed by direct user interaction, the network connection type is determined.

Networks are divided into the ones where downloading causes significant costs to the user and the ones which do not. Due to this, if the connection is e.g. a data call, GPRS connection, WCDMA connection etc. the confirmation query is presented before starting to download. However if the connection uses technology in which downloading cost does not depend on the size of the data, e.g. networks like WLAN etc., no queries are presented before starting to download.

As in some cases it might be that GPRS downloading cost does not depend on the amount of downloaded data, and on the other hand WLAN usage may have some restrictions etc., the user can be provided with a setting, that can be used to disable/enable confirmation queries for some internet access point(s).

Non-existing Network Connection:

Similar to the above-mentioned connection, it is determined whether the operation initiates directly from the user. If so, no queries are presented before establishing a connection and starting the downloading. On the other hand, in the situation where the operation is due to the device interaction, the network connection type is determined.

Also here networks are divided into ones where downloading causes significant costs to the user and ones which do not. Due to this, if connection is e.g. a data call, GPRS connection, WCDMA connection etc. confirmation query is presented before starting to download. However if the connection uses technology in which downloading cost does not depend on the size of the data, e.g. networks like WLAN etc., no queries are presented before starting to download.

As in some cases it might be that GPRS downloading cost does not depend on the amount of downloaded data, and on the other hand WLAN usage may have some restrictions etc., the user can be provided with a setting, that can be used to disable/enable confirmation queries for some internet access point(s).

Total Download:

When total amount of the downloaded data is increasing over the predetermined limit, e.g. 1 MB, and which downloading is due to device interaction after the last download being due to direct user interaction, the downloading is paused and confirmation query is presented before continuing downloading.

As in some cases it might be that GPRS downloading cost does not depend on the amount of downloaded data, and on the other hand WLAN usage may have some restrictions etc., the user can be provided with a setting, that can be used to disable/enable confirmation queries for some internet access point(s).

General Aspects:

Sometimes there can be more than one browser instance established. In those situations the logic according to the invention can be applied separately to all the instances, or as common to all instances.

The implementation of the determination can be carried out e.g. by having a set of rules for the different situations. The rules comprise options for the loading situation (such as initiating from the user, initiating from the device, size of the data, time of the download, network type etc.) and a corresponding order for querying the user confirmation or not. Other implementations are possible, e.g. a loop for checking whether the situation matches to different conditions the user confirmation is not asked, and it finally match to any of them, the user confirmation is asked. A person skilled in the art will appreciate, that the comparison, as well as the determination, can be implemented in different ways, and that this invention is not limited to any them.

EXAMPLES OF THE INVENTION

FIG. 1 illustrates one example of the steps of the invention in a situation where a network connection is already established. After the system has detected a new operation (100) it is checked whether it initiated from direct user interaction or device interaction (105). If is was from direct user interaction the operation is executed (140) directly, and if it was not features of the operation are defined (110). These features may relate to a size of downloaded data and to a time consumed by downloading. If the features do not match (115) predetermined conditions (e.g. size limit of 1 MB), a type for the network being used is checked (120). If the network is based on cellular network or other system (125), in which the user would have to pay for downloaded data amount or in which the user has usage restrictions, the user confirmation is queried (130). The operation is executed (140) when the user confirmation is positive (135) and the operation is not executed (141) with a negative confirmation.

Figure 2:
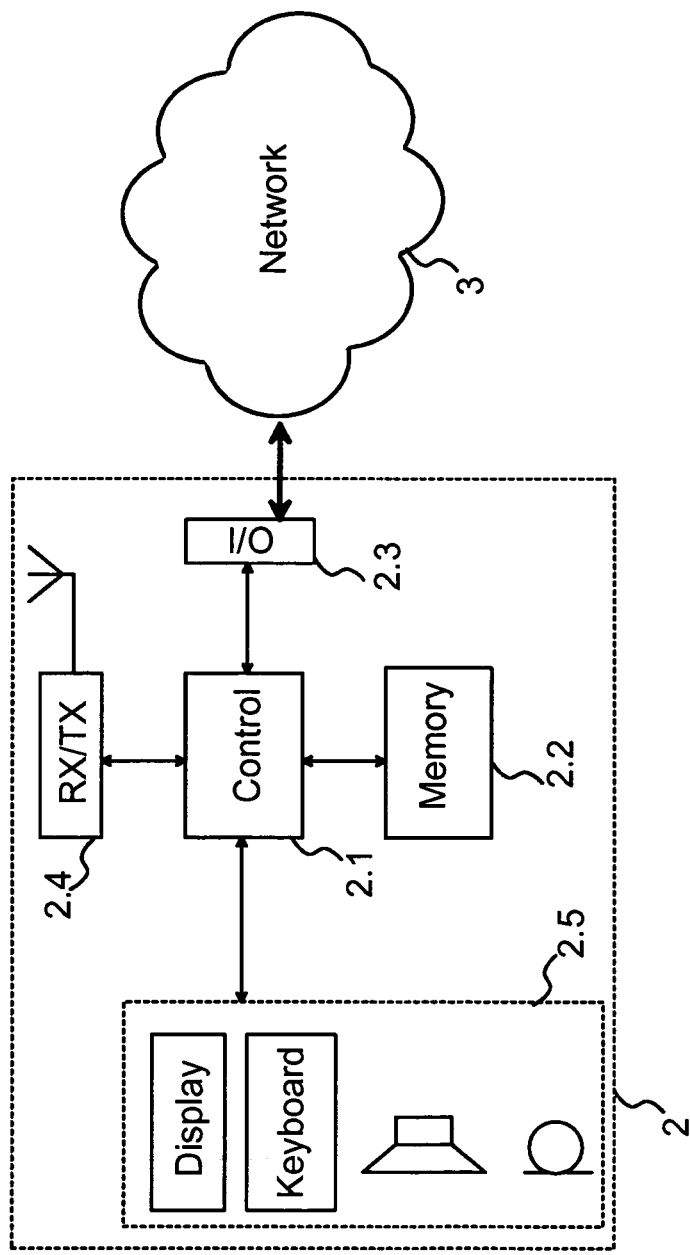
FIG. 2 illustrates an example of a device according to the invention.

An example of the device according to the invention is illustrated in FIG. 2 in very simplified manner. The device 2 can be for example any device enabling browsing in the global network 3, such as Internet. As examples of the devices are a mobile phone, a PDA-device, wireless or wired personal computer etc. The device 2 comprises e.g. control part 2.1 for controlling the operations of the device 2. In addition the device comprises a memory 2.2 for storing data, applications etc. and an I/O-connection 2.3 to the network 3. The device 2 can also comprise other means such as means for communication 2.4. Further the device 2 comprises a user interface 2.5 comprising at least a display and a keyboard. The display in the user interface 2.5 is configured to present the user confirmation queries to the user. The memory 2.2. comprises also an accessing means, e.g. a computer readable program, which is configured to determine which initiations require user confirmation and then query the user confirmation if needed, e.g., according to the method shown in FIG. 1.

It should be noticed that the method according to the invention is mainly addressed to confirmations about the network connection. There are still, however, other operations, which need confirmation. For example, in the situation where there are no free PDP (Packet Data Protocol) contexts for GPRS (General Packet Radio System) available, some previous connections may be closed. For this a user confirmation is queried. It should be noticed here, that this kind of a confirmation is of another type and it is out of the scope of the invention. The invention relates to confirmation needed in network loading.

In the description numeric values for sizes and limits are discussed. A person skilled in the art will appreciate that they are just examples. The logic according to the invention can be applied into web browsers and also other applications (for example Java applications) as well. Another example of the application is a messaging application. In addition a particulary HTML formatted e-mail may take advantage of the invention. The invention can be utilized almost in any browsing environment, where user confirmations are asked. For example, the invention can be utilized by browsers of mobile terminals.

In the description numeric values for sizes and limits are discussed. The man skilled in the art will appreciate, that they are just examples. The logic according to the invention can be applied into web browsers and also other applications (for example Java applications) as well. Other example of the application is e.g. a messaging application. In addition a particularly HTML formatted e-mail may take advantage of the invention. The invention can be utilized almost in any browsing environment, where user confirmations are asked. For example, the invention can be utilized by browsers of mobile terminals.

It should be understood, that foregoing detailed description is provided for clearness of understanding only, and not necessarily limitation should be read therefrom into the claims herein.

The invention claimed is:

1. A method for execution by a processor of a terminal device of a user for causing the terminal device to perform said method, comprising:
    detecting initiation of a new operation in an existing network connection between said terminal device and a network,
    determining whether or not the new operation was initiated by the user, wherein said determining is performed without direct user interaction;
    if the new operation was initiated by the user, executing the new operation without user confirmation,
    if the new operation was not initiated by the user, determining whether or not there exists a need for user confirmation by defining features of the new operation, comparing the features to predetermined conditions having predefined values, and if the features do fulfill the predetermined conditions, executing the new operation, but if the predetermined conditions are not fulfilled, determining the existing network connection and, if the existing network connection is based on a system in which the user would have to pay for the new operation, querying the user for confirmation; and
    if the user provides confirmation, executing the new operation, but
    if the user does not provide confirmation, not executing the new operation.

2. The method according to claim 1, wherein size of data being downloaded is one of the predetermined conditions having predefined values, and where the size of data being downloaded is determined and if the size exceeds the predefined value, the user is queried for confirmation.

3. The method according to claim 1, wherein time consumed for downloading is one of the predetermined conditions having predefined values, and where the time being consumed for downloading is determined and if the time exceeds the predefined value, the user is queried for confirmation.

4. The method according to claim 1, wherein if the existing network connection is determined to be based on a system in which the user has usage restrictions, the user is queried for confirmation.

5. The method according to claim 1, wherein the user is not queried for confirmation if accessing means are configured not to require confirmations.

6. An apparatus comprising
    a control; and
    memory including computer readable instructions,
    the memory and the computer readable instructions configured to, with the control, cause the apparatus at least to:
    detect initiation of a new operation in an existing network connection between said apparatus and a network,
    determine whether or not the new operation was initiated by a user, wherein said determining is performed without direct user interaction;
    if yes, execute the new operation without user confirmation,
    if no, query the user for confirmation;
    if the user provides confirmation, execute the new operation,
    if the user does not provide confirmation, do not execute the new operation.

7. The apparatus according to claim 6, wherein if the new operation is not initiated by the user, determining whether or not there exists a need for user confirmation by defining features of the new operation, comparing the features to predetermined conditions having predefined values, and querying the user for confirmation if the features do not fulfill the predetermined conditions.

8. The apparatus according to claim 7, where size of data being downloaded is one of the predetermined conditions having a predefined value, and where the apparatus is configured to determine size of data being downloaded and if the size exceeds the predefined value, to query the user for confirmation.

9. The apparatus according to claim 7, where time consumed for downloading is one of the predetermined conditions having a predefined value, and where the apparatus is configured to determine the time being consumed for downloading and if the time exceeds the predefined value, to query the user for confirmation.

10. The apparatus according to claim 7, configured to determine the existing network connection, and if the determined existing network connection is based on a system in which the user would have to pay for downloaded data amount, to query the user for confirmation.

11. The apparatus according to claim 6, configured to determine whether the user has usage restrictions in the existing network connection, and if so, to query the user for confirmation.

12. A non-transitory computer program product comprising computer readable instructions comprising a computer program that when executed by a control of an apparatus causes the apparatus to perform a method to determine a need for user confirmation, the method comprising:
- detecting initiation of a new operation in an existing network connection between the apparatus and a network,
- determining whether or not the new operation was initiated by a user, wherein said determining is performed without direct user interaction;
- if yes, executing the new operation without user confirmation,
- if no, querying the user for confirmation;
- if the user provides confirmation, executing the new operation,
- if the user does not provide confirmation, not executing the new operation.

13. The method of claim 1, wherein prior to said querying the user for confirmation if the features do not fulfill the predetermined conditions, the method comprises said determining the existing network connection, and if the existing network connection is determined to be based on a system in which the user would have to pay for downloaded data, only then querying the user for confirmation if the features do not fulfill the predetermined conditions and, if the existing network connection is determined to not be based on a system in which the user would have to pay for downloaded data, executing the new operation without querying the user for confirmation even though the features do not fulfill the predetermined conditions.

14. the apparatus of claim 6, wherein said memory and the computer readable instructions are configured to, with the control, cause the apparatus, prior to said query of the user for confirmation, to:
- determine the existing network connection, and if the existing network connection is determined to be based on a system in which the user would have to pay for downloaded data, only then to query the user for confirmation, and if the existing network connection is determined to not be based on a system in which the user would have to pay for downloaded data, executing the new operation without said query of the user for confirmation.

15. The non-transitory computer program product of claim 12, wherein said computer readable instructions are configured to, with the control, cause the apparatus, prior to said query of the user for confirmation, to:
- determine the existing network connection, and if the existing network connection is determined to be based on a system in which the user would have to pay for downloaded data, only then to query the user for confirmation, and if the existing network connection is determined to not be based on a system in which the user would have to pay for downloaded data, executing the new operation without said query of the user for confirmation.

* * * * *